United States Patent
Baughman et al.

(10) Patent No.: US 10,817,778 B2
(45) Date of Patent: Oct. 27, 2020

(54) CUSTOMIZED COOKING UTILIZING DEEP LEARNING NEUROMORPHIC COMPUTING OF HYPERSPECTRAL INPUT

(71) Applicant: International Business Machines Corporation, Armonk, NY (US)

(72) Inventors: Aaron K. Baughman, Silver Spring, MD (US); Rick A. Hamilton, II, Charlottesville, VA (US); Sathya Santhar, Chennai (IN); Ashish K. Tanuku, Lucas, TX (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 15/193,136

(22) Filed: Jun. 27, 2016

(65) Prior Publication Data
US 2017/0372197 A1 Dec. 28, 2017

(51) Int. Cl.
*G06N 3/04* (2006.01)
*G06N 3/08* (2006.01)
(Continued)

(52) U.S. Cl.
CPC .............. *G06N 3/0472* (2013.01); *A23L 5/00* (2016.08); *A23L 33/30* (2016.08); *G06N 3/0427* (2013.01);
(Continued)

(58) Field of Classification Search
CPC ........... G06K 9/00671; G06K 9/00664; G06K 9/6212; G06K 9/20; H04L 67/12;
(Continued)

(56) References Cited

U.S. PATENT DOCUMENTS

| 5,212,766 A | 5/1993 | Arima |
| 6,999,954 B2 | 2/2006 | Taggart et al. |

(Continued)

FOREIGN PATENT DOCUMENTS

| CN | 102712956 A | 10/2012 |
| WO | 03023692 A1 | 3/2003 |
| WO | 2014086486 A2 | 6/2014 |

OTHER PUBLICATIONS

Conti et al., "Brain-inspired Classroom Occupancy Monitoring on a Low-Power Mobile Platform", IEEE, Conference on Computer Vision and Pattern Recognition Workshops, Jun. 23-28, 2014, Columbus, OH, pp. 624-629.
(Continued)

*Primary Examiner* — Miranda M Huang
*Assistant Examiner* — Catherine F Lee
(74) *Attorney, Agent, or Firm* — Daniel R. Simek

(57) ABSTRACT

One or more processors receive hyperspectral band input, biometric input, and cognitive input as response input, from a user sampling a plurality of base foods, each base food prepared with a subset of ingredients and preparation techniques. The response input is transformed to a numeric representation of the respective input. Deep learning techniques are used to train an algorithm using the response data. A probabilistic ranking of base food is generated using unsupervised learning. Probability values of base food, ingredients, and preparation technique, associations preferred by the user, are generated, along with rules which define constraints associated with conditions for base food, ingredient, and preparation techniques, of user preferences. An objective function is generated that includes decision variables respectively aligned with constraints, and in response to optimizing the objective function, a preferred
(Continued)

base food and ingredients, with preferred conditions of the user, is determined.

18 Claims, 6 Drawing Sheets

(51) Int. Cl.
    *A23L 33/00*     (2016.01)
    *A23L 5/00*     (2016.01)
    *G06N 5/00*     (2006.01)
    *G06N 3/063*     (2006.01)

(52) U.S. Cl.
    CPC .......... *G06N 3/0445* (2013.01); *G06N 3/088* (2013.01); *G06N 5/003* (2013.01); *G06N 3/0481* (2013.01); *G06N 3/063* (2013.01)

(58) Field of Classification Search
    CPC .......... G06N 20/00; G06N 7/005; G06N 3/02; G06N 3/08; G06N 5/022; G06N 5/04; G02B 2027/0178; G06T 19/006; G06T 2207/30196; G06T 2207/30128
    See application file for complete search history.

(56) References Cited

U.S. PATENT DOCUMENTS

| | | | |
|---|---|---|---|
| 8,276,505 | B2 | 10/2012 | Buehler |
| 9,212,996 | B2* | 12/2015 | Watson .................. G01N 21/31 |
| 9,805,381 | B2* | 10/2017 | Frank .................... G06F 16/337 |
| 2002/0061505 | A1 | 5/2002 | Siler |
| 2006/0081653 | A1* | 4/2006 | Boland .................. A47J 31/40 222/243 |
| 2009/0236333 | A1 | 9/2009 | Ben-Shmuel et al. |
| 2012/0008835 | A1 | 1/2012 | Chao et al. |
| 2016/0275397 | A1* | 9/2016 | Neil ...................... G06N 3/0472 |

OTHER PUBLICATIONS

Dillmann et al., "Anthropomatics—The Science of Building Smart Artifacts for Humans", IEEE, RO-MAN, Jul. 31-Aug. 3, 2011, Atlanta, GA, pp. xviii-xix.

Gottlieb et al., "Clustered Programmable-Reconfigurable Processors", IEEE, International Conference on Field-Programmable Technology, Dec. 16-18, 2002, pp. 134-141.

Kodogiannis et al., "An intelligent based decision support system for the detection of meat spoilage", Research Gate, Article in Engineering Applications of Artificial Intelligence 34, Sep. 2014, © 2014 Elsevier Ltd., pp. 23-36.

Liu et al., "Predicting intramuscular fat content of pork using hyperspectral imaging", Journal of Food Engineering 134, © 2014 Elsevier Ltd., pp. 16-23.

Miyawaki et al., "Cooking Rehabilitation Support for Self-Reliance of Cognitive Dysfunction Patients", ACM, CEA'12, Proceedings of the ACM multimedia 2012 workshop on multimedia for cooking and eating activities, Nov. 2, 2012, Nara, Japan, pp. 19-24.

Ramasubramanian et al., "SPINDLE: SPINtronic Deep Learning Engine for Large-scale Neuromorphic Computing", ACM, ISLPED '14, Proceedings of the 2014 international symposium on Low power electronics and design, Aug. 11-13, 2014, La Jolla, CA, pp. 15-20.

Sang, Mutsuo, "Reflection Support System Based on an Attention Behavior Model for Cooking Cognitive Rehabilitation", 2014 8th Asia Modelling Symposium, Sep. 23-25, 2014, Taipei, pp. 118-123.

Shim et al., "Robust segmentation of cerebral arterial segments by a sequential Monte Carlo method: Particle filtering", Computer Methods and Programs in Biomedicine 84, © 2006 Elsevier Ireland Ltd., pp. 135-145.

Van Hoof, et al., "Addressing the healthcare cost dilemma by managing health instead of managing illness", ACM, Date '13, Proceedings of the Conference on Design, Automation and Test in Europe, © 2013 EDAA, pp. 1537-1539.

Zhao et al., "Nanodevice-based Novel Computing Paradigms and the Neuromorphic Approach", IEEE, International Symposium on Circuits and Systems (ISCAS), May 20-23, 2012, Seoul, pp. 2509-2512.

"Meat Paste Compositions Having Improved Creaminess", An IP.com Prior Art Database Technical Disclosure, Authors et. al.: Disclosed Anonymously, IP.com No. 000212094, IP.com Electronic Publication: Oct. 28, 2011, 28 pages.

"Sugar-Free Nutraceutical Composition and Process of Preparation Thereof", An IP.com Prior Art Database Technical Disclosure, Authors et. al.: Disclosed Anonymously, IP.com No. 000173306, IP.com Electronic Publication: Jul. 30, 2008, 14 pages.

"System and method of a smart diet preparation and generation", An IP.com Prior Art Database Technical Disclosure, Authors et. al.: Disclosed Anonymously, IP.com No. 000225614, IP.com Electronic Publication: Feb. 21, 2013, 11 pages.

Moore, Roger K., "Towards a Unified Theory of Spoken Language Processing", IEEE, Fourth IEEE Conference on Cognitive Informatics, Aug. 8-10, 2005, 6 pps.

Solgi, et al., "Stereo Where-What Networks: Unsupervised Binocular Feature Learning", IEEE, The 2013 International Joint Conference on Neural Networks (IJCNN), Aug. 4-9, 2013, Dallas, TX, 8 pps.

\* cited by examiner

CUSTOMIZED COOKING UTILIZING DEEP LEARNING NEUROMORPHIC COMPUTING OF HYPERSPECTRAL INPUT

FIELD OF THE INVENTION

The present invention relates generally to the field of determining culinary preferences, and more particularly to applying deep learning machine learning techniques to customize ingredients used for individualized food preparation preference.

BACKGROUND OF THE INVENTION

People throughout the world experience various impacts from local environmental conditions, health conditions, and diseases, as well as personal preferences, as they relate to consumed foods. Often, people consume as-is available food sources, either due to shortages, experimentation, or lack of information. Providing the appropriate content of food for individuals to meet recommended, needed, or preferred objectives can have a positive overall effect on the health, well-being, and pleasurable experience of people; however, determining the recommendations, needs, and preferences of individuals for food content selection and preparation is challenging. Although practical needs exist for customizing a meal to suit personal preferences or requirements, many approaches lack an all-inclusive consideration of what to include and avoid in preparation of a personally customized meal.

SUMMARY

Embodiments of the present invention disclose a method, computer program product, and system. The method provides for one or more processors to receive somatic and cognitive response data of a user sampling a plurality of base foods, in which each instance of a sample of a base food is prepared with a set of ingredients and preparation techniques from a plurality of ingredients and preparation techniques, and such that the somatic and the cognitive response data includes labeled and unlabeled data. One or more processors determine hierarchical features of the somatic and the cognitive input by unsupervised deep learning techniques of machine learning performed on the unlabeled data of the somatic and the cognitive data that is received. One or more processors generate a probabilistic ranking of the user's preference of the plurality of base foods, based on results of the unsupervised deep learning techniques of machine learning. One or more processors perform an association of one or more sets of ingredients and preparation techniques from the plurality of ingredients and preparation techniques, with one or more base foods of the plurality of base foods, respectively, based on supervised deep learning techniques of machine learning, using the somatic and the cognitive input of responses that are labeled. One or more processors generate a probability of the user preferring a base food of the plurality of base foods associated with a set of ingredients and preparation techniques of the plurality of ingredients and preparation techniques. One or more processors generate an objective function that includes a decision variable corresponding to each element of the set of ingredients and preparation techniques, and in response to optimizing the objective function, one or more processors determine an amount of the element of the set of ingredients and preparation techniques to include in preparation of the base food preferred by the user.

DETAILED DESCRIPTION

Figure 1:
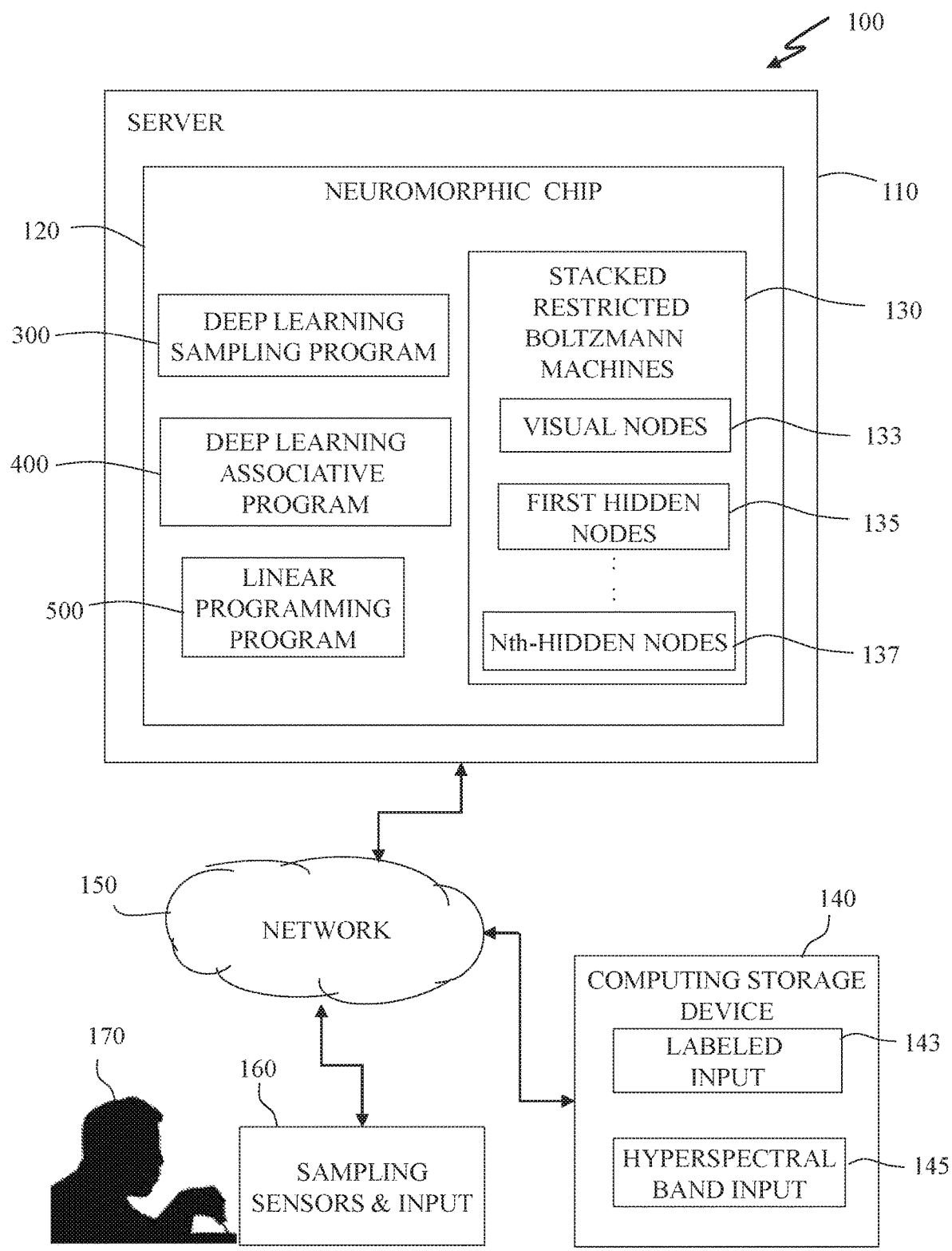
FIG. 1 is a functional block diagram illustrating a distributed data processing environment, in accordance with an embodiment of the present invention.

Embodiments of the present invention recognize that culinary experiences for most people involve trial and error selection from menu or recipe descriptions to find food and flavoring combinations that result in a pleasant experience for a consumer. This approach often includes many eating experiences that are less than pleasant. Some situations of determining preferred food and flavoring choices includes consideration of allergies, health conditions, and fitness needs, in combination with base food selection, preparation, and flavoring, to attain an overall pleasurable eating experience.

Embodiments of the present invention recognize that persons with health conditions, allergies, or certain digestive disorders could benefit from precisely controlling the food types and ingredients consumed. For example, doctors may recommend certain types of food and ingredients to avoid for a person with irritable bowel syndrome (IBS). However, it may be unlikely for doctors to advise patients on particular meal preparations or a daily meal-by-meal basis as to what food such a person can and should eat and what ingredients meet both health condition needs and personal preferences. This can be complicated further due to the differences people have regarding likes and dislikes of different base food types, flavorings, and preparation techniques.

Hyperspectral neuromorphic cooking utilizes deep learning, a recently developed machine learning field, to select base foods, such as beef, poultry, pork, pasta, or fish along with flavorings and spices that are individualized for a customer. Applying hyperspectral neuromorphic approaches to a cooking process begins with training a deep learning algorithm to recognize the responses and reactions of an individual to tasting samples of various base foods, flavorings, and preparation techniques, as an initial or infrequent customer. Frequent customers may not require subsequent taste sampling. Deep learning techniques measure hyperspectral bands, such as, but not limited to, thermograms, facial expressions, heart rate variability, eye dilation, and pitch of voice. The deep learning algorithm recognizes which base food the individual likes and prefers, and associates each available ingredient to (e.g., spices, flavorings, sauces, toppings, and preparation techniques) to combine with the base food. The rules used to associate ingredients with base foods are learned over time based on user preferences, tolerance to spice or other ingredients, cost of base food and ingredients, and time to prepare and cook. The list of ingredients associated with the base food are ranked to respond to a situation of a lack of availability of ingredients, or based on medical or health conditions (i.e., allergies, irritable bowel syndrome, etc.).

Embodiments of the present invention enable addressing medical and health conditions for which treatment includes control of food intake. Embodiments can learn the type of base food and flavoring combinations that support overall preference and benefit of a user based on the data collected during base food and ingredient sample tasting, such as the hyperspectral band response data, biometric response data, and cognitive response data. Some embodiments of the present invention include input from cooking books, articles, and documents, regarding ingredients and preparation techniques for base foods, and health and medical condition input.

For example, a user with a known digestive condition, such as irritable bowel syndrome (IBS), may receive recommendations from doctors on types of food to consume as treatment for the condition. However, doctors may not provide complete or particular recommendations on specific food, ingredients, and preparation techniques, on a day to day basis, as to what the user should eat or avoid. Embodiments of the present invention enables input of data identifying the base food, ingredients, and preparation techniques that did not irritate and those that caused irritation, as well as those meeting preferences of the user. Within a time period, embodiments of the present invention learn preferences and benefits of food selection, and determine optimized recommendations based on the user's preferences and available medical/health information and, in some embodiments, can benefit from the data of other users with similar health conditions.

Embodiments of the present invention provide a method, computer program product, and computer system for customized cooking, that includes preferred food preparation that utilizes deep learning neuromorphic computing of hyperspectral band input. The hyperspectral bands include of somatic and cognitive response data of a user sampling types of base food prepared with various ingredients and cooking techniques. Customized cooking utilizing deep learning neuromorphic computing of hyperspectral band input, referred to in brief as "hyperspectral neuromorphic cooking," utilizes the machine learning field of deep learning and neural networks to recognize a consumer's (also referred to herein as a patron, customer, or user) input or reaction to various food samples prepared and seasoned in various ways. In determining input and reactions to tasting of samples, data is generated from a plurality of sources, such as facial expressions, audio responses, profile input (cognitive input), thermographs, and may also include biometric data (somatic input), such as heart rate, blood pressure, and may include pupil dilation, among other responses. The generated hyperspectral bands of data, including cognitive and somatic inputs, are transformed by sampling into image windows of the particular response. In some embodiments of the present invention, the images are analyzed to obtain the spectrum of values of pixels for each image, resulting in a hyperspectral band image analysis.

Neuromorphic computing includes the use of very-large-scale integration systems containing one or more integrated chips that mimic biological neural structures of nervous systems by use of electronic analog circuits. Neuromorphic chips are fast pattern-matching engines designed to process sensory-type data, such as images and audio signals, and respond to detected changes using a different architecture than that used in traditional number crunching central processors. Neuromorphic chips attempt to model in silicon the way the brain processes information in parallel as billions of neuron-and-synapse-like circuits respond to sensory inputs such as visual and auditory signals. The chips, which incorporate brain-like models referred to as neural networks, are capable of performing activities, such as computer vision, data analytics, and machine learning.

Embodiments of the present invention include receiving and analyzing hyperspectral and biometric response data generated from user sampling of various food items. Labels are produced during user sampling, from cognitive input from the user, which may include responses to questions, comments, and behavioral reactions, and from somatic input, which includes biometric data. The unlabeled hyperspectral and biometric data is input to stacked, restricted Boltzmann machines (RBMs) for unsupervised learning of user responses to sampled foods, in order to extract hierarchical features from the data. In addition, the data gathered in the food sample phase is also used to determine seasonings, toppings, and preparation techniques used within the linear programming steps, discussed later, to match a customer's preferences or needs. In some embodiments of the present invention, the hyperspectral bands of data, obtained from user sampling of base foods and various preparation methods, seasonings, and flavorings, are included in a data set, and transformed by sampling into 32×32 pixel images, with one or more pixels contributing to features of a hyperspectral band input. Each visible node of the RBM receives a low-level feature of an item in the data set to be "learned."

The RBMs include two-layer neural networks, with one layer referred to as the visible, or input layer, and the other layer referred to as the hidden, or output layer. The visible and hidden layers are made up of multiple nodes, at which input processing takes place, such as weight assignments, products of inputs, and summary of weighted values and biases. The nodes are interconnected across the layers, but not within a layer, resulting in the designation of "restricted" Boltzmann Machines.

Input for each visible node is multiplied by stochastic weights, summed for each hidden node, which then receives an added bias, and is further processed by an activation function to determine an activation output. The activation outputs are then used as input to the hidden nodes in a backward pass to reconstruct the input data, with a different set of weights and biases applied from the hidden nodes to produce outputs at the visible nodes. The backward pass is done using Gibbs sampling in which each joint variable is generated towards reconstructing the original input. Gibbs sampling uses an algorithm for obtaining a sequence of observations which are approximated from a specified multivariate probability distribution, in embodiments of the present invention, from the joint probability distribution of the forward and backward weights as random variables. The error between the original input and the reconstructed input is used to adjust the weight values. This is done iteratively, until the divergence of the probability distributions of the forward and backward passes are minimized.

In embodiments of the present invention, an iterative process is performed in which response data is input to visible nodes the RBMs, and input response data from multiple visible nodes are combined and processed at each hidden node of a first layer of a multi-layer deep learning neural network. Iterative forward processing and backward reconstructing of response input data is performed to converge estimated features as represented in a vector space, to actual features, by reconstructing the response input data in a backward processing of activation function outputs of hidden nodes. The reconstruction is done by making adjustments of weights processed through activation functions for each hidden node. In stacked RBMs, outputs of the iteration between the first visible/hidden layer are passed to the next layer as input, in which the first hidden layer assumes the role of the visible layer. The activation outputs of the first layer are multiplied by weights at the nodes of the second hidden layer and result in another set of activation outputs. Processing iteratively through stacked RBMs produces a feature hierarchy, which enables machine learning of complex structures within data. In each hidden layer, the weights are adjusted by iteration of forward and backward processing to approximate the input from the previous layer. The weights resulting from the unsupervised learning performed by the stacked RBMs, approximate features of the data and facilitate later label-based learning and classification activities.

Some embodiments of the present invention include iterative deep machine learning through multiple layers of a neural network using unsupervised learning to extract features of the input data and develop a feature hierarchy in which features of one layer are aggregated and combined in a subsequent layer to establish more complex feature recognition. In some embodiments of the present invention, the outputs of the stacked RBMs are entered as inputs to a traditional feed forward neural network, using supervised learning to fine tune training of the network.

In supervised learning, labeled data of food samples and corresponding response data are used as ground truth data to associate with feature extraction and response data from previous user and sensor input during sample eating sessions. Supervised learning is applied to an associative layer for determining ingredient and preparation preferences of the user. The associative layer is a feed forward neural network that learns from labeled data, or supervised learning. The activation weights output from the stacked RBMs are updated based on the label of images from the set of hyperspectral bands, including biometric responses and health condition input. The set of hyperspectral bands will have the same label, which is important due to the use of Gibbs sampling that uses a joint probability distribution generated for each variable. The output of the top level layer provides a probability of a favorable set of ingredients and particular flavoring attributes, such as spicy or bland, and a base food is mapped to each of the output nodes. Flavoring can include, but is not limited to sauces, toppings, condiments, and marinades, which may include mixtures of multiple ingredients. The output of the feed forward neural network, before mapping to a base food, provides generative rules for linear programming, performed later, to optimize the choice of flavorings, such as spices.

Ingredients may include herbs, spices, seasoning, flavorings, toppings, and sauces. Examples presented but are not intended to be limiting, include flavorings, which may be the preparation and addition of other food items, for example, garlic, onions, mushrooms, and other vegetable, fruit, or root items. In some embodiments, flavorings may include adding prepared meat to flavor other foods, such as smoked meats, cured meats, and bacon. Toppings may include individual or combinations of flavorings, seasonings, herbs, and spices, or may be prepared sauces based on dairy, oils, tomato, or other sauce bases. In some embodiments, food preparation preference by a user may also include how the base food is prepared and cooked, such as baked, fried, grilled, roasted, seared, stewed, or slow-cooked. In embodiments in which a food is cooked, such as cold dishes, preparation preference may include, for example, how the base food(s) are mixed or combined with other foods and ingredients. Hereafter, use of the term ingredient(s) may include a selection of a base food and all the seasonings, flavorings, and preparation techniques used to prepare the food item.

Base food preferences, such as a type of meat, pasta, or a vegetarian main item, are determined based on the hierarchical features identified during unsupervised deep learning, and refined during supervised learning, using labeled data from food sampling and direct customer input. Preferences for flavoring ingredient options, such as, but not limited to, additions or combinations of spices, herbs, seasonings, sauces, and toppings are also determined. The base foods, flavoring, and preparation options are represented as objects of an objective function, and the quantity, cost, availability, and preparation time and effort, are established as decision variables of the objects. Linear programming is performed to optimize the objective function, and results in determining the optimal preparation and flavoring option ingredients for the base food, that provides an optimal pleasurable experience for the customer (user).

In some embodiments of the present invention, decision variables of the objective function include information regarding the user's health condition that includes constraints and preferences of base food and flavoring option ingredient selections. In other embodiments, decision variables are included in the objective function that reflect direct input of known preferences of the user. In yet other embodiments, decision variables include fitness and well-being objectives of the user as applied to selection of base food and flavoring option ingredients, and in still other embodiments, availability, cost, and preparation time for base food and flavoring option ingredients are included in objective function decision variables.

In some embodiments of the present invention, input and processing of user responses during subsequent eating sessions contribute to a continual improvement of determining base food and flavoring option ingredient preferences of the user towards a more pleasurable eating experience, in which known aspects of health conditions, fitness objectives, personal preferences, and response signals are included in determination of an optimal "pleasurable eating experience."

In other embodiments, hyperspectral image data and biometric signals may be used as input to determine base food and flavoring option ingredients for non-human subjects, such as would apply to optimizing pet food ingredients. In some embodiments, the determined optimal base food and flavoring option ingredients may be determined and prepared for a user, in which the food is prepared but to be cooked by the user at a subsequent time.

The present invention will now be described in detail with reference to the Figures. FIG. 1 is a functional block diagram illustrating a distributed data processing environment, generally designated 100, in accordance with an embodiment of the present invention. Distributed data processing environment 100 includes server 110, sampling sensors and input 160, user 170, and computing storage device 140, all connected via network 150.

Network 150 can be, for example, a local area network (LAN), a telecommunications network, a wide area network (WAN), such as the Internet, a virtual local area network (VLAN), or any combination that can include wired, wireless, or optical connections. In some embodiments of the present invention, network 150 may be a bus connection within server 110. Network 150 can include one or more wired and/or wireless networks that are capable of receiving and transmitting data, text, voice, and/or video signals, including multimedia signals that include text, voice, data, and video information. In general, network 150 can be any combination of connections and protocols that will support communications between computing storage device 140, sampling sensors and input 160, and neuromorphic chip 120 of server 110.

In some embodiments of the present invention, user 170 may be a customer for a food provider, such as a diner or restaurant. In other embodiments, user 170 may be a patient following a set of controlled food input recommendations to improve health or achieve health-related goals. User 170 represents one or more people that engage in food sampling activity, such that embodiments of the present invention automatically determine the user preferences of base foods, preparation techniques, and flavorings, from the response signal data and corresponding labels of foods sampled by the user, such as user 170. In yet other embodiments, user 170 may be a non-human, such as a pet.

In some embodiments of the present invention, sampling sensors and input 160 represents the hardware and software tools and devices that may be used to capture hyperspectral, cognitive, and somatic input. In some embodiments, sampling sensors and input 160 includes various sensor and imaging devices to obtain response data from a user, such as user 170, sampling various base foods that are prepared using various techniques and flavoring options. In some embodiments of the present invention, a base food is considered the primary component of a food item, such as, but not limited to, a portion of beef, pork, poultry, fish, seafood, or a non-meat item, such as tomato, potato, zucchini, squash, mushroom, tofu, fruit, or other non-meat main food items.

Sensors and imaging devices used by sampling sensors and input 160 include devices to obtain hyperspectral bands of, but not limited to, facial expression, audio patterns, voice recognition, thermal imaging, and pupil dilation. Sampling sensors and input 160 also includes sensing devices to obtain biometric signals of a user sampling food items, such as blood pressure, pulse rate, and breathing rate. In some embodiments of the present invention, sampling sensors and input 160 may also include behavioral signals of a user, as well as text or audio input regarding health conditions of the user. In some embodiments, sampling sensors and input 160 may include input of user preferences, such as responses to questions regarding base foods, seasonings, or data included in a user profile. Input received from sampling sensors and input 160 are transformed to digital images of pixels, for example, a 32×32 pixel image. The data associated with each pixel, such as one or more hyperspectral value for a pixel, can be input to visible nodes of restricted Boltzmann machines for unsupervised learning of the features associated with sampling of food items by a user, such as user 170.

Computing storage device 140 includes labeled input 143 and hyperspectral band input 145. Computing storage device 140 includes stored data of labeled input 143 and hyperspectral band input 145. In some embodiments of the present invention, computing storage device 140 may be a hard disk drive, a solid state drive, an optical read-write drive, a tape drive, or other storage device on which data and instructions can be stored. In other embodiments, computing storage device 140 may be primary memory within a computing device, such as server 110.

Labeled input 143 is data obtained from user sampling of multiple base food items that have been prepared and flavored in various ways. Label data of label input 143 includes a descriptive word or phrase of a particular base food, preparation technique, and flavoring associated with each of various food items sampled. Data from labeled input 143 is associated with corresponding responses of user food sampling, obtained from sampling sensors and input 160, which results in the data of hyperspectral band input 145. Labeled input 143 is used during feed forward neural network processing steps to fine tune the training of the algorithms performed by the programs of neuromorphic chip 130.

Hyperspectral band input 145 is a collection of response data from a user, such as user 170 sampling various base foods, prepared by various techniques and flavoring options. Hyperspectral imaging collects and processes data from a range of measurable input, such as across the electromagnetic spectrum, obtaining a range or spectrum for each pixel of an image. Hyperspectral band input 145 includes various response signals from a user sampling prepared food items, such as facial expression images, thermogram images, speech recognition, and voice pattern images. In some embodiments of the present invention, hyperspectral band input 145 may also include biometric inputs, such as blood pressure, pulse rate, and pupil dilation collected during user sampling of various prepared food items. In some embodiments, the health condition of a user, such as user 170, is included as data in hyperspectral band input 145. Health condition data may include health-related conditions of the user that are known and that may influence the preference of base food, ingredient, and preparation techniques of the user to comply with health and medical recommendations addressing the known condition(s). In yet other embodiments, cognitive response data from the user, directly indicating food, ingredient, and preparation preferences of the user may be included in the input data set of hyperspectral band input 145.

Server 110 is shown to include neuromorphic chip 120, which includes logical and algorithmic components for stacked restricted Boltzmann machines, and further includes deep learning sampling program 300, deep learning associative program 400, and linear programming program 500. In some embodiments of the present invention, the programs are stored on neuromorphic chip 120. In other embodiments, deep learning sampling program 300, deep learning associative program 400, and linear programming program 500, are stored in other memory resources of server 110 and accessible to neuromorphic chip 120. Neuromorphic chip 120 is also shown containing stacked restricted Boltzmann machines 130, which includes visual nodes 133, first hidden nodes 135, and Nth-hidden nodes 137; the series of hidden nodes resulting in the "stacked" designation. In some embodiments of the present invention, the logic and algorithmic functions of neuromorphic chip 120 are provided by specialized data structures, stored in the memory of server 110 and accessible to deep learning sampling program 300, deep learning associative program 400, and linear programming program 500.

In some embodiments of the present invention, provided the functionality of a neuromorphic chip, such as neuromorphic chip 120 or specialized data structures residing in memory of server 110, server 110 can be a management server, a web server, a mobile computing device, or any other electronic device or computing system capable of receiving, sending, and processing data, and supporting the operational functions of deep learning sampling program 300, deep learning associative program 400, and linear programming program 500. In other embodiments, server 110 can represent a server computing system utilizing multiple computers as a server system, such as in a cloud computing environment. In still other embodiments, server 110 can be a laptop computer, a tablet computer, a netbook computer, a personal computer (PC), a desktop computer, a personal digital assistant (PDA), a smart phone, or any programmable electronic device capable of performing the programmable instructions of deep learning sampling program 300, deep learning associative program 400, and linear programming program 500, of neuromorphic chip 120, within distributed network processing environment 100, via network 150. In another embodiment, server 110 represents a computing system utilizing clustered computers and components (e.g., database server computers, application server computers, etc.) that act as a single pool of seamless resources when accessed within distributed network processing environment 100. Server 110 may include internal and external hardware components, as depicted and described in further detail with respect to FIG. 6.

Neuromorphic chip 120 is a fast pattern-matching semiconductor processing engine designed to process sensory-type data, such as images, audio signals, and respond to detected changes using different architecture than that used in traditional number crunching central processors. In general, neuromorphic chips, such as neuromorphic chip 120, attempt to model in silicon the massively parallel way the brain processes information. Those neurons also change how they connect with each other in response to changing images, sounds, and the like. Neuromorphic chips, which incorporate brain-inspired models called neural networks, do the same, enabling systems that can perform computer vision, data analytics, and machine learning. In some embodiments of the present invention, neuromorphic chip 120 performs the operational instructions of deep learning sampling program 300, deep learning associative program 400, and linear programming program 500. In some embodiments, the instructions for deep learning sampling program 300, deep learning associative program 400, and linear programming program 500 are included in neuromorphic chip 120. In other embodiments, instructions for deep learning sampling program 300, deep learning associative program 400, and linear programming program 500 are stored in a computer-readable storage device connected to server 110, accessible to and performed by neuromorphic chip 120.

Stacked restricted Boltzmann machine 130 is a multi-layer type of neural network in which unlabeled data, such as data from hyperspectral band input 145, is input to visible nodes. The input data from each visible node is weighted and sent to each hidden node of layer 1, where the weighted inputs are summed and a bias value is added. The hidden layer values are fed to an activation function to produce an activation value. Stacked restricted Boltzmann machine 130 uses the activation value outputs to perform a backward process to reconstruct the original input values. The back and forward processing is iterative, and in each iteration the assigned weights are adjusted to minimize the divergence between the original input and the activation output. The resulting minimized divergence output value is used as input to a second layer of hidden nodes, and the process repeats for the designated number of layers chosen for stacked restricted Boltzmann machine 130. Feature vectors defining a feature space are determined by the output of the stacked restricted Boltzmann machine 130, determining hidden and more complex structure and hierarchical features of the data, which are then used as input to a feed forward neural network using labels to classify output.

Deep learning sampling program 300 receives and processes hyperspectral and biometric response data generated from the user sampling of various food items, as well as cognitive response data from the user sampling of various food items. Deep learning sampling program 300 also generates labels that correspond to particular sampled food items. In some embodiments of the present invention, hyperspectral and biometric data are received from sampling sensors and input 160 and cognitive input, which may include user responses, comments to questions, and behavioral responses to sampling. Deep learning sampling program 300 may also receive user profile information and information corresponding to the base food and seasonings being sampled by the user. In some embodiments of the present invention, deep learning sampling program 300 stores the response data received from user sampling of prepared foods and the labels associated with the sampled foods in hyperspectral band input 145 and labeled input 143 of computing storage device 140. In other embodiments, deep learning sampling program 300 receives as inputs in memory, the response data from user sampling of prepared foods, and the labels associated with the sampled foods, if capacity is available. In some embodiments of the present invention, the hyperspectral band response data, biometric response data, cognitive response data, and health-related condition of the user, obtained during user sampling of base foods and various preparation methods, seasonings, and flavorings are included in a data set and are transformed by sampling into 32×32 pixel images with one or more pixels contributing to features of input. In some embodiments of the present invention, the pixels of the images from the transformed data sets are represented as observational vectors and fed as input to a stacked restricted Boltzmann machine, such as stacked restricted Boltzmann machine (RBM) 130.

In some embodiments of the present invention, each visible node of RBM 130 receives a low-level feature of an item in the 32×32 pixel images of the hyperspectral band, biometric, and cognitive response data set to be "learned." The response data set is input to RBM 130, which performs unsupervised learning of the user responses to sampled foods to extract hierarchical features from the data. In addition, the data gathered in the user food-sampling phase is also used to determine seasonings, toppings, and preparation technique preferences used within the linear programming steps, discussed later.

Deep learning associative program 400 performs an associative operation of a feed forward neural network. Deep learning associative program 400 receives the features of the food sampling response data determined from unsupervised learning with the use of stacked RBMs, such as stacked RBM 130 used with Gibbs sampling. Using labeled data received or generated during food sampling, deep learning associative program 400 performs supervised learning to refine the data features, determine a ranking of user-based food preferences, and preferences of associating seasoning, flavoring ingredients, and preparation techniques, with base foods. Deep learning associative program 400 associates the ground truth input of labeled response data from user food sampling to the extracted features determined during unsupervised learning. The feature outputs of the stacked RBMs are mapped to labeled response data from the user food sampling, identifying preferences of base foods, ingredients, and preparation techniques, which are ranked. Deep learning associative program 400 generates rules which define constraints, which are included as objects of an objective function, and may include, for example, base foods, ingredients, constraints determined from health conditions, cost of ingredients, preparation techniques, and time for preparation. If a particular object is not preferred, not available, or should be avoided, a decision variable aligned with the particular object or constraint is minimized in the optimization of the objective function. If an object is preferred, readily available, or is encouraged for health condition reasons, linear programming program 500 increases the decision variable values for these objects towards a maximum, while performing an optimization of the objective function. For example, a user may have a constraint of the cost of a prepared meal, or may require food that is bland rather than spicy, due to a digestive condition. Linear programming program 500 minimizes the decision variables for the cost and spiciness objects in performing optimization of the objective function.

The activation weights are further modified based on the label of the input data, and a set of hyperspectral bands of input data associated with a particular combination of base food and flavoring (ingredients). The output of the top layer of the associative layers provides a preference probability of a particular flavoring, such as the probability of a spicy or bland preference. From the ranking of base foods, ingredients, and preparation, deep learning associative program 400 also outputs rules, objects, and variables that are determined and will form the objective function used in linear programming steps. The rules from the output of the feed forward neural network establishes the constraints to be considered in optimizing the preparation and seasoning of the food for the user (customer). The constraints are represented as objects in an objective function defined by deep learning associative program 400, in which decision variables are aligned with each constraint, and which determine how much or to what extent a constraint is considered to optimize the pleasant experience for the user (customer).

Linear programming program 500 performs an optimization of the objective function defined by deep learning associative program 400, which includes determining rules that generate objects, and decision variables aligned with objects. By optimizing the objective function, linear programming program 500 determines which ingredients and preparation are user-preferred for meals, and how much of each ingredient is to be used to achieve the flavoring and preparation of a preferred base food. The rules determined from deep learning associative program 400 provide information regarding measurement of decision variables, which are mapped directly to ingredients that are available. The rules also define constraints that map to objects determined from deep learning associative program 400.

Linear programming program 500 produces outputs for the decision variables of the objective function constraints (objects) which includes consideration of the availability, cost, time of preparation, and health condition constraints, as well as indicating the amount of each ingredient (and preparation technique) to be used in preparing the preferred base food flavored and prepared to the preferences of the user.

Figure 2:
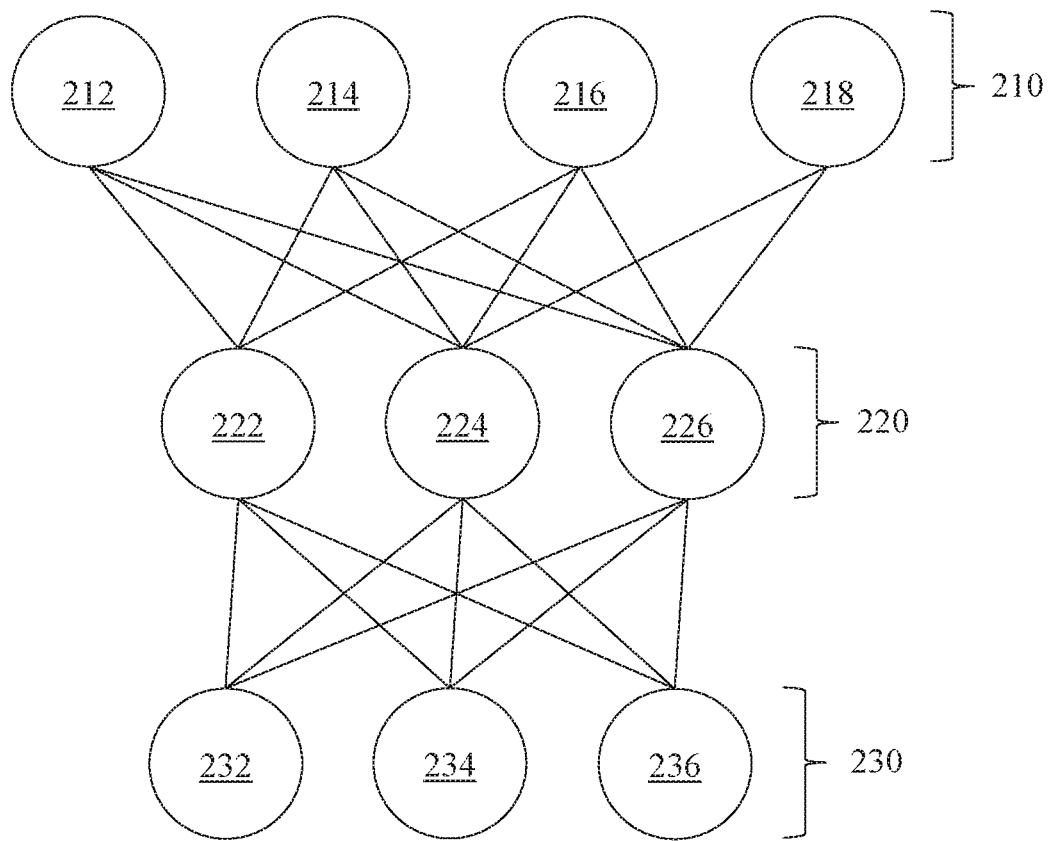
FIG. 2 is a block diagram illustrating an example arrangement of nodes of stacked restricted Boltzmann machines (RBMs) included within the algorithm logic of neuromorphic chip 120, of server 110, within distributed data processing environment 100.

FIG. 2 is a block diagram illustrating an example arrangement of nodes of stacked restricted Boltzmann machines (RBMs) included within the algorithm logic of neuromorphic chip 120, of server 110, within distributed data processing environment 100. The use of stacked RBMs enables the use unlabeled data as input to train the logic of neuromorphic chip 120. During customer sampling of food, somatic and cognitive data is obtained and used as input to the stacked RBMs to determine features of the input data.

Stacked RBMs include multiple levels of nodes, often referred to as a set of visual nodes that receive the initial input, and one or more sets of "hidden nodes." FIG. 2 depicts a simplified representation of a stacked RBM for purposes of explanation and example, and includes visual nodes 210, first layer hidden nodes 220, and second layer hidden nodes 230. Visual nodes 210 includes input nodes 212, 214, 216, and 218, which are shown with connections from each of input nodes 212, 214, 216, and 218 to each hidden node 222, 224, 226, of first layer hidden nodes 220. Stacked restricted Boltzmann machines include connections of nodes between layers, but do not have connections between nodes within a layer, earning the term "restricted." In some embodiments of the present invention, input nodes 212, 214, 216, and 218 of visual nodes 210 receive input data with each node receiving a portion of input data. For example, facial recognition input data of a customer sampling various foods may be represented by a "N pixel×M pixel" image with each pixel of the image corresponding to a visual node.

First layer hidden nodes 220 includes hidden nodes 222, 224, and 226, which are shown in one embodiment of the present invention, receiving input from each of visual nodes 212, 214, and 216. In other embodiments, each hidden node receives input from some visual nodes. Visual nodes 212, 214, and 216 work in correspondence with first layer hidden nodes 220, in which each hidden node typically receives inputs from multiple visual nodes and performs operations on the inputs resulting in output values that include assigned weights. The hidden layer values are fed to an activation function to produce an activation value. Stacked restricted Boltzmann machine 130 uses the activation value outputs to perform a backward process to attempt to reconstruct the original input values. The forward and backward processing is iterative and in each iteration the assigned weights are adjusted to minimize the divergence between the original input and the activation output. In some embodiments of the present invention, the resulting output values of the first layer of hidden nodes that reconstruct the original input values are used as input values to a second layer of hidden nodes.

Second layer hidden nodes 230 includes hidden nodes 232, 234, and 236. The output values of hidden nodes 222, 224, and 226, of second layer hidden nodes 220, are depicted as input to each of hidden nodes 232, 234, and 235, and the process described above repeats iteratively. The resulting output values of second layer hidden nodes 230 are used as input to a third layer of hidden nodes, if the stacked RBM includes three or more layers of hidden nodes (not shown). The process is repeated for the designated number of hidden node layers chosen for stacked restricted Boltzmann machine 130.

The output of the stacked RBMs includes features identified from the unlabeled input data, and the multiple layers of hidden nodes, forming the "stacked" structure of the RBMs, further includes determination of complex features by the hierarchical unsupervised learning of the stacked RBMs.

Figure 3:
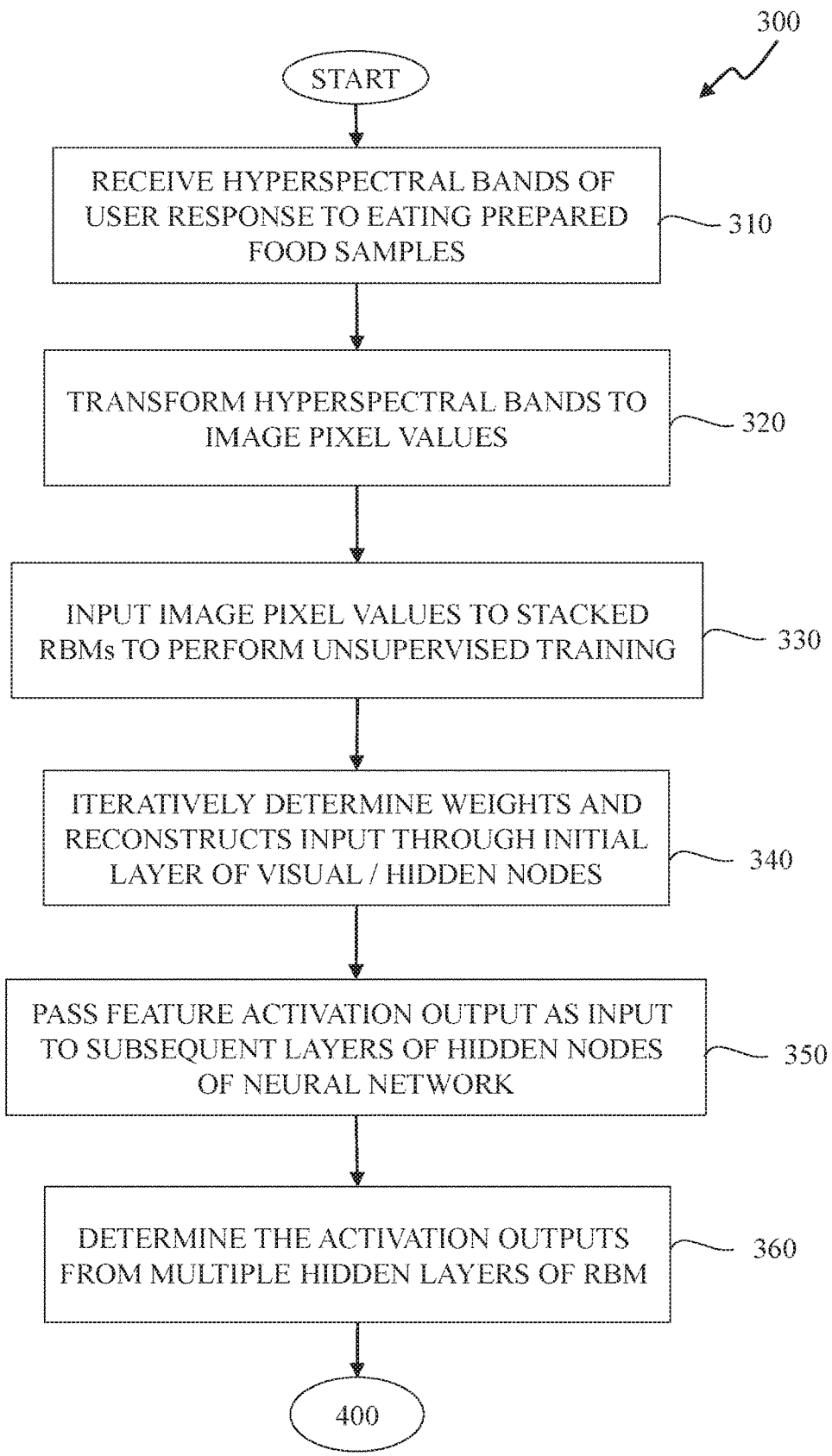
FIG. 3 illustrates operational steps of a deep learning sampling program, operating on a neuromorphic chip within the distributed data processing environment of FIG. 1, in accordance with an embodiment of the present invention.

FIG. 3 illustrates operational steps of deep learning sampling program 300, inserted on neuromorphic chip 120 of server 110, within the distributed data processing environment of FIG. 1, in accordance with an embodiment of the present invention. Deep learning sampling program 300 performs a pattern analysis within a deep learning neural network. In step 310, deep learning sampling program 300 receives hyperspectral bands of somatic and cognitive user responses to eating prepared food samples. In some embodiments of the present invention, the hyperspectral bands include, but are not limited to biometric response data, such as facial expressions, audio feedback, thermograms, blood pressure, and pulse rate. Cognitive input may include verbal or text-based input of a customer's preference or reaction to various base meal foods, such as beef, pork, poultry, pasta, or vegetarian, as well as customer input regarding various ingredients and preparations.

In step 320, deep learning sampling program 300 transforms the hyperspectral bands into image pixel values. In some embodiments of the present invention, deep learning sampling program 300 performs transforms of input data to images, such as a 32-pixel×32-pixel image. For example, a facial expression or audiogram associated with a customer's sampling of food may be input as a video frame image or a display image of a section of an audiogram. Deep learning sampling program 300 transforms the input to a 32-pixel×32-pixel image in which each pixel includes a value associated with a corresponding component of the input data. In some embodiments of the present invention, input data from various bands of hyperspectral band data may be represented in separate pixel image transforms. In other embodiments, other input formats that can be represented in matrix forms are used.

In step 330, deep learning sampling program 300 inputs the image pixel values to stacked restricted Boltzmann machines (RBMs) to perform unsupervised training of neuromorphic chip logic. Stacked restricted Boltzman machines include multiple layers of visible—hidden node pairs, in which the hidden nodes of one level of node pairs serves as an input set of nodes for a next level of hidden nodes. In some embodiments of the present invention, image pixel values of input data are input to visible nodes of the stacked RBMs, such as RBM 130, which have a pre-designated number of hidden node layers. RBMs perform as data structures that process input data between layers of nodes, combining inputs of multiple visible nodes into each hidden node. The input data is combined through an activation function that acts as a threshold, determining if a particular hidden node is "activated," such that the output value of the activation function has significance relative to the features of the input. Deep learning sampling program 300 determines weights associated with inputs that are combined and produces new weights as outputs of the of activation functions.

For example, hyperspectral band data, transformed to image pixels and each pixel of the image is further represented as vector of intensity values, or alternatively, may be represented as a set of edges defining a particular region of a shape or space. Values from the transformed hyperspectral band data are input to visible nodes, including visible nodes 212, 214, 216, and 218 of FIG. 2, for example. Input values from several visible nodes are combined at a hidden node, such as the values of visible nodes 212, 214, 216, and 218, combining at hidden node 222. The input values are each multiplied by a separate weight, and then the products are summed and a bias is added. The result is passed through an activation function to produce the output for hidden node 222. Similarly, activation function outputs are produced for each node of a first layer of hidden nodes.

Deep learning sampling program 300 iteratively determines weights and reconstructs input values through an initial layer of visual and hidden nodes, in step 340. Having produced output values for each node of the initial hidden node layer of the stacked RBMs, deep learning sampling program 300 processes backwards from the activation function outputs, using the outputs as inputs in the backward process, to reconstruct the initial input values. Weights are adjusted for each iteration to minimize the gap between initial input data and resulting activation function output. The iterative process produces a multivariate probability distribution, predicting the probability of output given a weighted input, and predicting the probability of an input, given weighted activation outputs. This produces a joint probability distribution of inputs and activation outputs. In some embodiments of the present invention, sampling of values of the visible and hidden nodes is done using Gibbs sampling. The activation function output from the iterative process between two node layers serves as input data for the next layer of hidden nodes.

In step 350, deep learning sampling program 300 passes feature activation output values from a previous hidden node layer, as input to a subsequent layer of hidden nodes of a neural network. Deep learning sampling program 300 generates activation output values for the subsequent layer of hidden nodes, and iteratively reconstructs the input values in a backward pass, using the activation outputs of the subsequent layer of hidden nodes as the input for the backward pass. The iterative process results in a converging process of weights of the input and output values until the divergence of the joint probability distribution of the weights are minimized. The resulting weights are used as input for the next set of hidden nodes, and repeats until activation outputs with minimized joint distribution gaps are produced. Each layer of a deep-learning network requires the input, the coefficients, a bias, and the transform or activation algorithm. In some embodiments of the present invention, the input is numeric data, as a vector, fed as the output from the previous layer or the original input. The coefficients are the weights, which are randomly produced initially, then adjusted with each forward and backward iteration between nodes of a layer. The bias insures that some nodes in a layer will be activated, regardless of the input data, and the transformation is an algorithm modifying data to better enable computation of gradients within the data. The use of multi-layers of hidden node sets results in activation values of groups of features, followed by groups of groups of features produces a feature hierarchy, in which more complex structures of the data are learned.

In step 360, deep learning sampling program 300 determines the resulting activation outputs from multiple hidden node layers of the RBM. The resulting output represents the hierarchical features of the data set obtained from the user sampling of various food preparations. The data pattern analysis of deep learning sampling program 300 provides the features that will be further refined in a feed-forward neural network utilizing supervised learning to further classify the features extracted by deep learning sampling program 300. The resulting outputs of deep learning sampling program 300 are fed as inputs to deep learning associative program 400.

Figure 4:
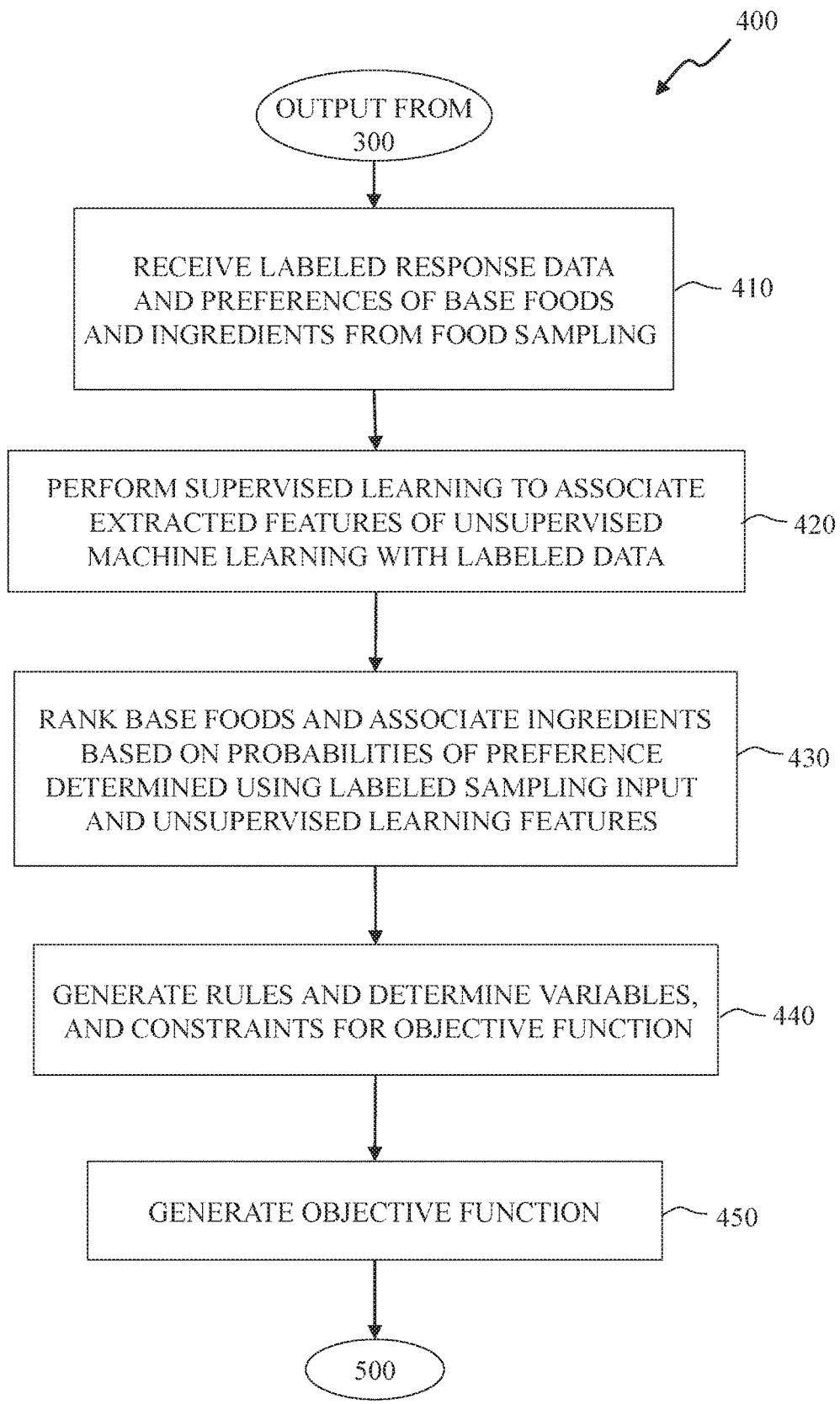
FIG. 4 illustrates operational steps of a deep learning associative program, operating on a neuromorphic chip 120, within the distributed data processing environment of FIG. 1, in accordance with an embodiment of the present invention.

FIG. 4 illustrates operational steps of deep learning associative program 400, inserted on neuromorphic chip 120 of server 110, within the distributed data processing environment of FIG. 1, in accordance with an embodiment of the present invention. Deep learning associative program 400 performs deep learning classification associating features with labeled input and response data within an associative top layer of a feed forward neural network. The associative layer is a feed forward neural network that learns from labels or supervised learning. The activation weights are updated based on the label of the image, and the set of hyperspectral bands will have the same corresponding label. Updating the activation weights based on the labels associated with images has significance because the Gibbs sampling uses a joint probability generative for each variable. Generative models are used in machine learning for modeling data directly, or as a step to forming a conditional probability density function. The output of the top level layer provides a probability of a particular, such as spicy or bland. A base meal is attached to each of the output nodes.

In step 410, deep learning associative program 400 receives labeled response data and preferences of base foods and ingredients from user food samplings. Labeled input data received from user tasting of food samples provides ground truth input. Base food preferences are determined based on feature outputs from unsupervised learning that are further refined with labeled data during supervised learning. Base food preferences also consider input constraints which, in some embodiments of the present invention, may include food preferences related to user health and medical condition input. Base food preferences may also be received from user food profiles input during initial steps of a user tasting food samples. In addition, a list of ingredients used in preparation of base foods during food sampling, is received by deep learning associative program 400.

In step 420, deep learning associative program 400 performs supervised learning as a top layer of a neural network to associate extracted features of unsupervised machine learning with labeled response data. Labeled response data received from user sampling includes various base foods, and each instance of a base food prepared with various combinations of ingredients and preparation techniques.

For example, base foods may include different cuts of beef, poultry, pork, ham, fish, seafood, tofu, pasta, or other preferred dietary main food item. Ingredients, as applied herein, include seasoning, spices, cheeses, sauces, toppings, flavorings, and preparation techniques, individually or in combination, and applied to a base food. Preparation techniques may include frying, deep frying, baking, boiling, broiling, grilling, or other method or technique used in cooking and/or preparing food for consumption.

Labeled hyperspectral band and biometric data, as well as labeled cognitive input of food sampling preferences, and in some embodiments, medical and health condition input regarding applicable allergies and food recommendations and constraints, are applied in supervised learning to further refine activation output weights used to determine the probabilities of the user preferring a particular preparation and flavoring ingredients of a base food.

In step 430, deep learning associative program 400 ranks base foods and associates ingredients based on probabilities of preference determined using labeled sampling input and unsupervised learning features. The ranking of base food preferences of a user are determined by labeled sampling input and cognitive input, such as a food profile selections by the user, and in some embodiments of the present invention, health and medical constraints. The activation weights determined from the unsupervised learning are modified, based on the labels of the input data and a set of hyperspectral bands of input data associated with a particular combination of base food and ingredients. The output of the top level layer of the associative layers of the neural network provides a preference probability of a particular ingredient (e.g., flavoring), such as the probability of preferring spicy, salty, cheesy, or bland, mapped to a base food. Deep learning associative program 400 generates as an output of the feed forward neural network, the probabilities of what base food the user prefers, and from the list of available ingredients (included from the user tasting of food samples), the probabilities of which ingredients, in combination with the base food, the user prefers.

In step 440, deep learning associative program 400 generates rules and determines variables and constraints of an objective function. The output of the feed forward neural network provides rules to generate variables for an objective function, to optimize the choices of ingredients. In particular, the output of the feed forward network before mapping to a base meal provides generative rules for linear programming, performed in subsequent steps (FIG. 5), to optimize the choice of ingredients. For example, if an output node corresponding to "spiciness" has a 98% rating and the user indicated that they do not prefer spicy food, or medical input recommends the user avoid spicy food, a rule is generated that filters ingredients based on a spiciness index. For example, if a banana pepper tasted by the user has a Scoville Scale rating of 100 and the user found it 98% spicy, then the spicy rule says that ingredients must be less than 100 on the Scoville Scale. The rules may represent preferences of the user, as well as food related recommendations for health and medical conditions of the user.

The rules from the output of the feed forward neural network establishes the constraints to be considered in optimizing the choice, preparation, and flavoring of the base food for the user (customer). The constraints are represented as objects in an objective function and each object, or constraint, is aligned with decision variables, and which is used to determine to what extent a constraint is considered to optimize the food experience for the user (customer). Rules are generated to align and support avoiding or prioritizing particular base foods and ingredient combinations, as well as supporting user preferences in selection of base food and ingredient combinations.

In some embodiments of the present invention, an optimized food experience for the user may include consideration of a user's preferences along with recommendations for health or medical conditions, such as an allergy to a type of food or ingredient. Optimization may also consider other food types and ingredients to avoid in support of treatment for a condition. For example, a user may have allergic reactions to certain types of nuts or oils derived from nuts, and thus a rule is generated to avoid such ingredients. In other cases, fatty or fried food are recommended to avoid for diets supporting weight loss or heart disease, and a rule is generated to minimize base foods or ingredients that are high in fat content, and consider preparation techniques that exclude deep frying. In other cases, certain foods or ingredients may be desirable to supplement deficiencies in vitamins or other essential nutrients.

In some embodiments of the present invention, deep learning associative program 400 generates rules regarding the availability of ingredients and base foods, the cost of ingredients and preparation, the time to prepare and cook the food, and base food and flavoring preferences of the user. The generated rules establish constraints that are objects for the objective function, and each includes a decision variable that is used to determine the degree of consideration of the constraint, whether an ingredient is included, and if so, how much ingredient to use. Deep learning associative program 400 determines the constraints, and the decision variables for base foods and available ingredients, as well as other constraints and decision variables to consider, such as cost of ingredients, and preparation time. In some embodiments of the present invention, known geographical and cultural preferences associated with base foods and ingredients used in preparation are included in labeled input data, and in determining rules for the generation of an objective function.

In step 450, having determined the constraints and generated decision variables, deep learning associative program generates the objective function. The objective function is defined by the user and may include preferences and constraints of a medical or health plan such as to eat healthy, vegan, vegetarian. The objects represent the considerations to be made for preference or health benefit, and the decision variables determine how much of each object is considered or used.

Figure 5:
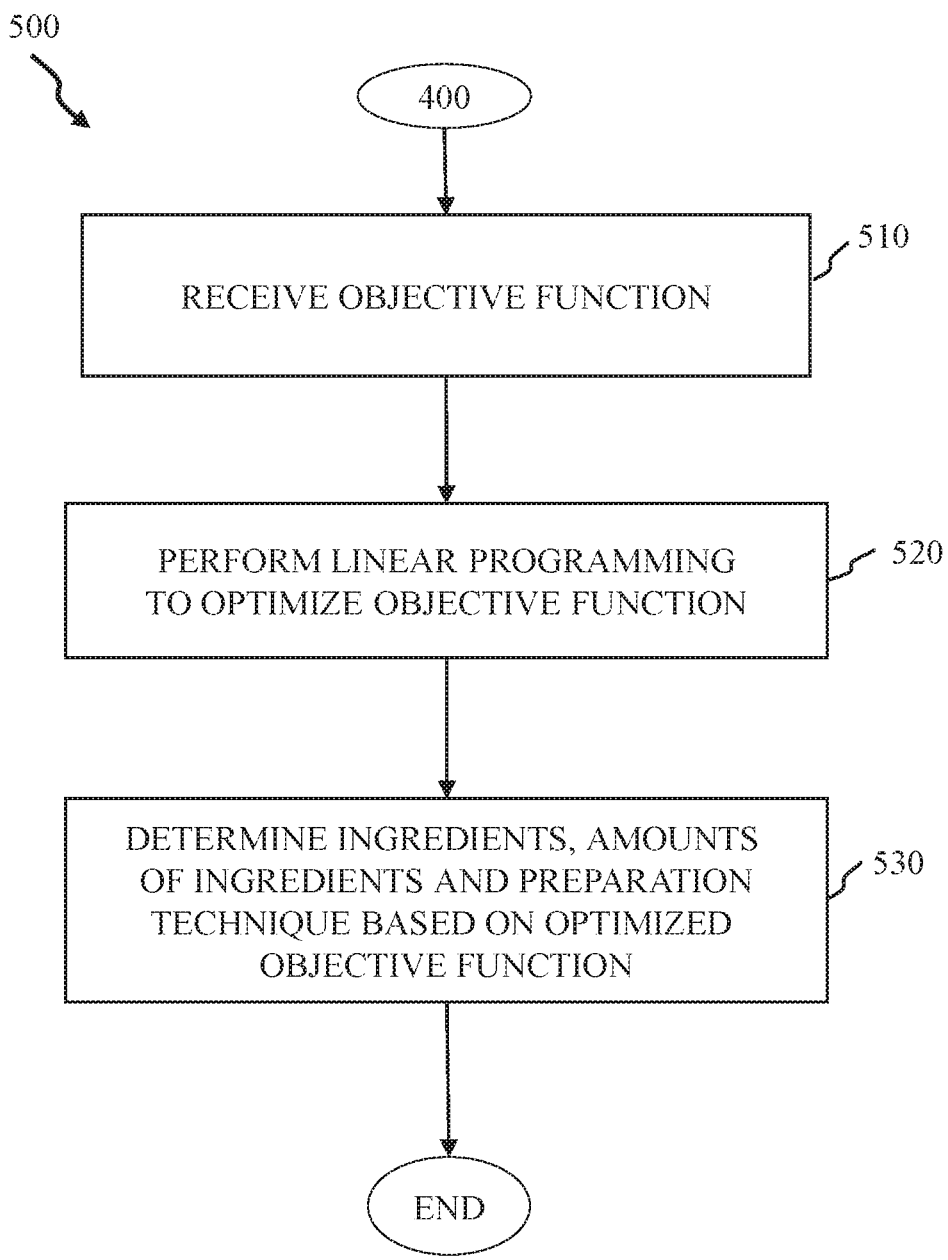
FIG. 5 illustrates operational steps of a linear programming program, operating on a neuromorphic chip 120, within the distributed data processing environment of FIG. 1, in accordance with an embodiment of the present invention.

FIG. 5 illustrates operational steps of linear programming program 500, operating on server 110, within the distributed data processing environment of FIG. 1, in accordance with an embodiment of the present invention. Linear programming program 500 performs an optimization of an objective function generated as one output of the top layer feed forward neural network of deep learning associative program 400. In step 510, linear programming program 500 receives the objective function from an output of deep learning associative program 400. The objective function includes the objects, which are defined by constraints determined during deep learning processing, and decision variables for each of the objects. The objects include determined constraints of cost, time to prepare and cook, health and medical compliance recommendations, user preferences, and ingredients that are available. The decision variables serve to represent the extent of constraint consideration or the amount of each ingredient to be used.

For example, a user expresses low concern regarding the cost of the food to be provided but is in a bit of a hurry. In addition, information regarding a health condition to minimize consumption of spicy foods, as a recommended treatment for a digestive condition, is determined as a constraint. A user preference for chicken as a base food, with Italian sauce and seasoning is also determined from deep learning associative program 400. The objective function includes decision variables for base food objects, a cost object, a time of preparation and cooking object, and multiple ingredients objects that include components to provide the preference of Italian sauce and seasoning.

In step 520, linear programming program 500 performs an optimization of the objective function generated for a particular user, using linear programming. The optimization includes minimizing the object constraints to be avoided or excluded, and promoting or maximizing the object constraints to be supported. Promoted or supported objects may include user preferences of base food and flavoring, and desirable conditions (such as low cost and expedient preparation and cooking time, for example), and minimized objects may include spicy ingredients, high cost ingredients, unavailable ingredients, or preparation that requires longer periods of time.

For example, objects of an objective function may include base foods of beef, pork, chicken, and fish, and ingredients may include cheese sauce, salt and pepper, lemon juice, and oregano. The objective function includes rules to minimize fat content and salt intake, and includes a user preference ranking of base foods in the order of most preferred to least preferred of beef, fish, chicken, and pork. Deep learning associative program 400 generates the objects corresponding to the determined constraints, and generates decision variables for each object. The generated objective function is passed to linear programming program 500.

The objective function optimized by linear programming program 500 generates low values for the decision variables of pork and chicken base foods, due to the low user preference ranking, and generates higher decision variables for beef and fish based on user preference ranking; however, the constraint to minimize fat content results in the base food of beef having a reduced decision variable value, for example. Due to constraints the decision variables for cheese sauce and salt and pepper would be lower, to avoid salt intake and to minimize fat content of the cheese sauce. In this simplified example, the optimized objective function would prepare a fish dish, and include lemon juice and/or oregano, depending on the response data of the user during food sampling, for fish base foods that were flavored with lemon juice and that were flavored with oregano. The decision variables for lemon juice and oregano would indicate an amount to be used in preparing the fish for the user.

In step 530 linear programming program 500 determines the ingredients, amount of each ingredient, and preparation techniques to be used to produce the preferred food item for the user. The decision variables for each of the objects of the optimized objective function indicates the selection of ingredients and the amount of each selected ingredient to be used in preparation of the food item. The decision variables of the optimized objective function also indicate the base food and preparation techniques to be used to meet the constraints of availability, time of preparation, cost of ingredients, user health conditions, and user preference to deliver a user food dish of overall preference.

In some embodiments of the present invention, machine learning is used to train the algorithms in the neuromorphic chip by providing input that includes somatic and cognitive response data from sampling foods, and input of health conditions of an individual like blood pressure, blood sugar level, pH, blood alcohol level, and drug use, using biometric inputs. In some embodiments, input data may include a number of data sets related to statistical, molecular, and food pairing combinations which suits the individual user, taking into account the medical history and also the environmental factors, such as cultural practices and preferences in particular geographical areas. The algorithm recognizes the hyperspectral bands and learns over time to produce personalized recipes and dishes from ingredients and amounts to include, generated by linear programming of an objective function that is optimized on occasion based on frequency of user visits and the factors and variables that have been previously learned.

Computer-aided techniques of generating new recipes that consider analysis of numerous base foods and ingredients and perform permutations and combinations of ingredients result in producing dishes and flavors that are uncommon and possibly unique. Such computer-aided techniques may be transformed to systems having high levels of computational creativity directed to personal preferences and needs by incorporating deep learning machine learning techniques and hyperspectral analysis. Systems of this type are capable of creating recipes with ingredients that suit the health conditions (needs) of the individual as well as accommodating the individual's likes and dislikes. For regular customers, the system will tune itself based on time to time analysis and would evolve towards producing accurate recipes that consider a particular user's priority factors. Priority factors may include time (user is in a hurry), cost, digestive sensitivity, allergy, and mood (adventurous, curious, etc.).

Figure 6:
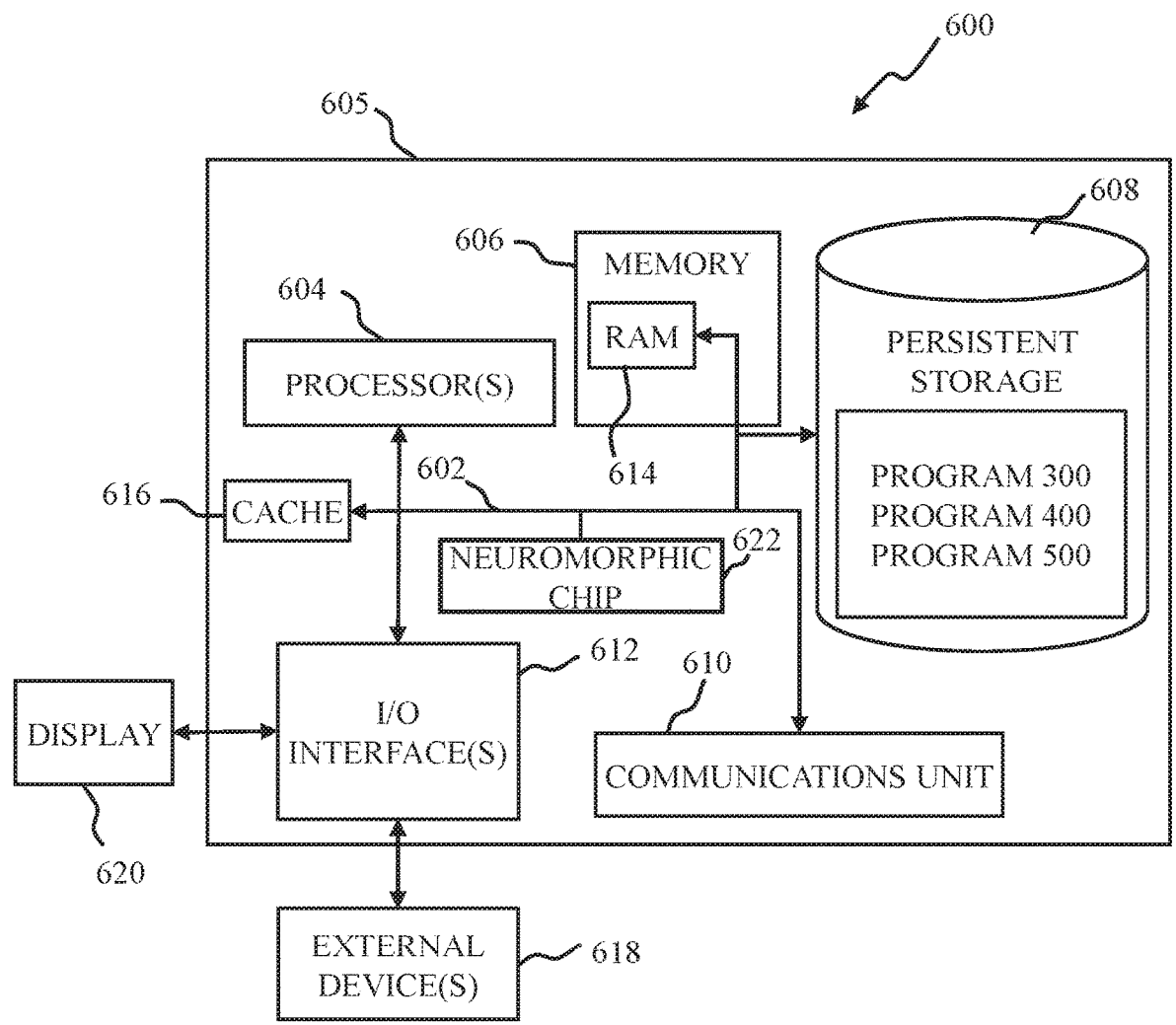
FIG. 6 depicts a block diagram of components of a computing system including a computing device and a neuromorphic chip capable of operationally performing the deep learning sampling program, the deep learning associative program, and the linear programming program, in accordance with an embodiment of the present invention.

FIG. 6 depicts a block diagram of components of system 600, which includes computing device 605. Computing device 605 includes components and functional capability similar to server 110 (FIG. 1), in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 605 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606, cache memory 616, and persistent storage 608 are computer readable storage media. In this embodiment, memory 606 includes random access memory (RAM) 614. In general, memory 606 can include any suitable volatile or non-volatile computer readable storage media.

In some embodiments of the present invention, deep learning sampling program 300, deep learning associative program 400, and linear programming program 500 are included and operated by neuromorphic chip 622 as a component of computing device 605. In other embodiments, deep learning sampling program 300, deep learning associative program 400, and linear programming program 500 are stored in persistent storage 608 for execution by neuromorphic chip 622 in conjunction with one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

In some embodiments of the present invention, neuromorphic chip 622 is included in computing device 605 and connected to communications fabric 602. Neuromorphic chip 622 includes electronic logic to provide stacked restricted Boltzmann machines, and a feed forward neural network, comprising deep learning algorithmic components that are trainable and perform machine learning. In other embodiments, the logistical and algorithmic components operations are performed by specialized data structures, included within computing device 605, which perform the deep learning functions of the stacked restricted Boltzmann machines, and feed forward neural network.

Communications unit 610, in these examples, provides for communications with other data processing systems or devices, including resources of distributed data processing environment 100, such as computing storage device 140, and sampling sensors and input 160. In these examples, communications unit 610 includes one or more network interface cards. Communications unit 610 may provide communications through the use of either or both physical and wireless communications links. Deep learning sampling program 300, deep learning associative program 400, and linear programming program 500, may be downloaded to persistent storage 608 through communications unit 610.

I/O interface(s) 612 allows for input and output of data with other devices that may be connected to computing system 600. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., web content program 300 can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Embodiments of the present invention apply deep learning methods that include unsupervised learning by training neuromorphic logic using somatic and cognitive response data as input to stacked restricted Boltzmann machines and Gibbs sampling. The unsupervised learning determines features and the hierarchy of features of user response data generated from user sampling different foods, seasoning, flavoring, preparations, and base food types. Embodiments of the present invention include deep learning methods applying supervised learning in which labeled response data is applied to the extracted features to refine weight values of activation function output. The labeled response data is used with supervised learning to associate base foods and ingredient combinations (as well as other constraints included in input data) and produce probability levels of user preference.

In some embodiments of the present invention, the probabilities generated by association of base foods with combinations of ingredients and preparation are used to generate rules to measure decision variables, which are mapped directly to the ingredients available (in which "ingredients" includes spices, seasonings, toppings, preparation methods, and any known health or allergy related considerations). The rules are used to define constraints or objects of an objective function, in which decision variables are aligned to each object of the function. Objects may include, but are not limited to cost, time of preparation (if the customer is in a hurry), spiciness, availability of ingredients, as well as health-related considerations. The multi-objective function is optimized, and in some embodiments of the present invention, some variables of the objective function are set to be minimized and some to be maximized. The output of the objective function suggests the amount of ingredient (or the extent or type of preparation or consideration of constraints), to be used in preparing and cooking preferred food for the customer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
receiving, by one or more processors, somatic and cognitive response data of a user generated during the user's sampling of a plurality of base foods, wherein each instance of a sample of a base food is prepared with a set of ingredients and a particular preparation technique from a plurality of ingredients and a plurality of preparation techniques, and wherein the somatic and the cognitive response data includes labeled and unlabeled data;

determining, by the one or more processors, hierarchical features of the somatic and the cognitive response data utilizing machine learning techniques of unsupervised deep learning that include use of stacked restricted Boltzmann machines (RBMs) performed on the unlabeled data of the somatic and the cognitive response data that is received;

generating, by the one or more processors, a probabilistic ranking of a user's preference of the plurality of base foods, based on results of the unsupervised deep learning;

performing an association, by the one or more processors, of one or more sets of ingredients and one or more preparation techniques from the plurality of ingredients and the plurality of preparation techniques, with one or more base foods of the plurality of base foods, respectively, based on the machine learning techniques of supervised deep learning, using the somatic and the cognitive response data that are labeled and mapping the response data that are labeled to the hierarchical features determined by the unsupervised deep learning using the stacked RBMs;

generating, by the one or more processors, a probability of the user's preference of a base food of the plurality of base foods associated with a preferred set of ingredients and a preferred preparation technique of the plurality of ingredients and the plurality of preparation techniques;

generating, by the one or more processors, an objective function that includes a plurality of objects respectively representing a selection of a base food from a plurality of base foods, a selection of a set of ingredients from a plurality of ingredients, and a selection of a particular preparation technique from a plurality of preparation techniques, based on the output of the stacked RBMs mapped to the response data of supervised deep learning that are labeled, and one or more decision variables as constraints corresponding respectively to the plurality of objects; and in response to optimizing the objective function, the one or more processors determining an amount of an element of the set of ingredients and the particular preparation technique to include in preparation of the base food preferred by the user.

2. The method of claim 1, wherein the somatic and the cognitive response data of the user sampling the plurality of base foods includes hyperspectral band data, biometric data, behavioral response data, audio response data, and user provided input to preference rating of sampled food.

3. The method of claim 1, wherein the somatic and the cognitive response data of the user sampling the plurality of base foods are transformed to a pixel-based image, wherein each pixel of the pixel-based image includes a numeric value representing a portion of the somatic and cognitive response data.

4. The method of claim 1, wherein the determination of the hierarchical features of the somatic and the cognitive response data, and the generation of the probabilistic ranking of the user's preference of a base food of the plurality of base foods prepared are performed utilizing a neuromorphic chip configured for unsupervised deep learning techniques.

5. The method of claim 4, wherein the neuromorphic chip is trained to perform the unsupervised deep learning techniques of machine learning by input of the unlabeled data of the somatic and the cognitive response data to visible nodes of a stacked restricted Boltzmann machine operating on the neuromorphic chip.

6. The method of claim 1, wherein the association of the one or more sets of ingredients and preparation techniques with the one or more base foods is performed by utilizing a neuromorphic chip configured for the supervised deep learning techniques.

7. The method of claim 1, further comprising:
generating, by the one or more processors, rules that define one or more constraints regarding preferences of the user for base foods and the one or more sets of ingredients and preparation techniques, wherein the rules are generated based on labeled input that is received regarding one or more conditions of the user.

8. The method of claim 1, wherein the optimization of the objective function is performed by linear programming.

9. The method of claim 1, wherein the one or more decision variables corresponding respectively to the plurality of objects of the objective function include a cost of food, a set of ingredients, a preparation technique, a time to prepare and cook the food, a quantity of a respective base food and a respective ingredient, an availability of the respective base food and the respective ingredient, and a health condition of the user.

10. A computer program product, comprising:
one or more computer-readable storage media having program instructions executable by one or more computer processors, the program instructions comprising:
program instructions to receive somatic and cognitive response data of a user generated during the user's sampling of a plurality of base foods, wherein each instance of a sample of a base food is prepared with a set of ingredients and a particular preparation technique from a plurality of ingredients and a plurality of preparation techniques, and wherein the somatic and the cognitive response data includes labeled and unlabeled data;
program instructions to determine hierarchical features of the somatic and the cognitive response data utilizing machine learning techniques of unsupervised deep learning that include use of stacked restricted Boltzmann machines (RBMs) performed on the unlabeled data of the somatic and the cognitive response data that is received;
program instructions to generate a probabilistic ranking of a user's preference of the plurality of base foods, based on results of the unsupervised deep learning;
program instructions to perform an association of one or more sets of ingredients and one or more preparation techniques from the plurality of ingredients and the plurality of preparation techniques, with one or more base foods of the plurality of base foods, respectively, based on the machine learning techniques of supervised deep learning, using the somatic and the cognitive response data that are labeled and mapping the response data that are labeled to the hierarchical features determined by the unsupervised deep learning using the stacked RBMs;
program instructions to generate a probability of the user's preference of a base food of the plurality of base foods associated with a preferred set of ingredients and a preferred preparation technique of the plurality of ingredients and the plurality of preparation techniques;
program instructions to generate an objective function that includes a plurality of objects respectively representing a selection of a base food from a plurality of base foods, a selection of a set of ingredients from a plurality of ingredients, and a selection of a preparation technique from a plurality of preparation techniques, based on the output of the stacked RBMs mapped to the response data of supervised deep learning that are labeled, and one or more decision variables as constraints corresponding respectively to the plurality of objects, and optimization of the objective function is performed by linear programming; and in response to optimizing the objective function, program instructions to determine an amount of an element of the set of ingredients and the particular preparation technique to include in preparation of the base food preferred by the user.

11. The computer program product of claim 10, wherein the somatic and the cognitive response data of the user sampling the plurality of base foods includes hyperspectral band data, biometric data, behavioral response data, audio response data, and user provided input to preference rating of sampled food.

12. The computer program product of claim 10, wherein the somatic and the cognitive response data of the user sampling the plurality of base foods are transformed to a pixel-based image, wherein each pixel of the pixel-based image includes a numeric value representing a portion of the somatic and cognitive response data.

13. The computer program product of claim 10, wherein the determination of the hierarchical features of the somatic and the cognitive response data, and the generation of the probabilistic ranking of the user's preference of a base food of the plurality of base foods prepared are performed utilizing a neuromorphic chip configured for unsupervised deep learning techniques.

14. A system comprising:
one or more computer processors, one or more computer-readable storage media, program instructions stored on the one or more computer-readable storage media for execution by at least one of the one or more processors, the program instructions comprising:
program instructions to receive somatic and cognitive response data of a user generated during the user's sampling of a plurality of base foods, wherein each instance of a sample of a base food is prepared with a set of ingredients and a particular preparation technique from a plurality of ingredients and a plurality of preparation techniques, and wherein the somatic and the cognitive response data includes labeled and unlabeled data;
program instructions to determine hierarchical features of the somatic and the cognitive response data utilizing machine learning techniques of unsupervised deep learning that include use of stacked restricted Boltzmann machines (RBMs) performed on the unlabeled data of the somatic and the cognitive response data that is received;
program instructions to generate a probabilistic ranking of a user's preference of the plurality of base foods, based on results of the unsupervised deep learning;
program instructions to perform an association of one or more sets of ingredients and one or more preparation techniques from the plurality of ingredients and the plurality of preparation techniques, with one or more base foods of the plurality of base foods, respectively, based on the machine learning techniques of supervised deep learning, using the somatic and the cognitive response data that are labeled and mapping the response data that are labeled to the hierarchical features determined by the unsupervised deep learning using the stacked RBMs;
program instructions to generate a probability of the user's preference of a base food of the plurality of base foods associated with a preferred set of ingredients and a preferred preparation technique of the plurality of ingredients and the plurality of preparation techniques;
program instructions to generate an objective function that includes a plurality of objects respectively representing a selection of a base food from a plurality of base foods, a selection of a set of ingredients from a plurality of ingredients, and a selection of a preparation technique from a plurality of preparation techniques, based on the output of the stacked RBMs mapped to the response data of supervised deep learning that are labeled, and one or more decision variables as constraints corresponding respectively to the plurality of objects and optimization of the objective function is performed by linear programming; and
in response to optimizing the objective function, program instructions to determine an amount of an element of the set of ingredients and the particular preparation technique to include in preparation of the base food preferred by the user.

15. The system of claim 14, wherein the association of the one or more sets of ingredients and preparation techniques with the one or more base foods is performed by utilizing a neuromorphic chip configured for the supervised deep learning techniques.

16. The system of claim 14, wherein a particular decision variable, in response to having a constraint directed to an element of the set of ingredients and preparation techniques, includes consideration of the constraint in determination of a value for the particular decision variable performance of an optimization of the objective function.

17. The system of claim 14, wherein the optimization of the objective function is performed by linear programming.

18. The system of claim 14, wherein the one or more decision variables corresponding respectively to the plurality of objects of the objective function include a cost of food, ingredients, and preparation, a time to prepare and cook the food, a quantity of a respective base food and a respective ingredient, an availability of the respective base food, and the respective ingredient, and a health condition of the user.

* * * * *